May 22, 1962   M. J. MITCHELL   3,035,384
HITCH STRUCTURE FOR TRACTOR MOUNTED CORN HARVESTERS
Filed May 21, 1959   5 Sheets-Sheet 1

INVENTOR.
MELVILLE J. MITCHELL
BY
ATTORNEYS.

May 22, 1962  M. J. MITCHELL  3,035,384
HITCH STRUCTURE FOR TRACTOR MOUNTED CORN HARVESTERS
Filed May 21, 1959  5 Sheets-Sheet 2

INVENTOR.
MELVILLE J. MITCHELL
BY
Wolfe, Hubbard, Voit & Osann
ATTORNEYS.

May 22, 1962 M. J. MITCHELL 3,035,384
HITCH STRUCTURE FOR TRACTOR MOUNTED CORN HARVESTERS
Filed May 21, 1959 5 Sheets-Sheet 3

INVENTOR.
MELVILLE J. MITCHELL
BY
ATTORNEYS.

May 22, 1962 M. J. MITCHELL 3,035,384
HITCH STRUCTURE FOR TRACTOR MOUNTED CORN HARVESTERS
Filed May 21, 1959 5 Sheets-Sheet 4

INVENTOR.
MELVILLE J. MITCHELL
BY
ATTORNEYS.

May 22, 1962  M. J. MITCHELL  3,035,384
HITCH STRUCTURE FOR TRACTOR MOUNTED CORN HARVESTERS
Filed May 21, 1959  5 Sheets-Sheet 5

INVENTOR.
MELVILLE J. MITCHELL
BY
Wolfe, Hubbard, Voit & Osann
ATTORNEYS.

United States Patent Office 3,035,384
Patented May 22, 1962

3,035,384
HITCH STRUCTURE FOR TRACTOR MOUNTED CORN HARVESTERS
Melville J. Mitchell, Birmingham, Mich., assignor to Massey-Ferguson Inc., Racine, Wis., a corporation of Maryland
Filed May 21, 1959, Ser. No. 814,728
4 Claims. (Cl. 56—15)

The invention relates to corn harvesters of the tractor mounted type and more particularly to an improved hitch structure for mounting such harvesters on a tractor.

Corn harvesters are relatively large complicated implements and when mounted on a tractor make it impractical to use the tractor for hauling or any other job that it would normally be called upon to perform. With this in view, one object of the invention is to provide an improved hitch structure which enables the harvester to be mounted on or detached from the tractor by one man with a minimum of effort and very quickly so that, as a practical matter, the tractor is always available for any job.

Another object is to provide an improved hitch structure which greatly facilitates the mounting on and detachment from the tractor of a corn harvester of the type which includes picking or snapping units disposed at each side of the tractor along with a husking or shelling unit supported behind the tractor in a position to serve both picking units.

Still another object is to provide a hitch structure which supports the picking unit for pivoting movement between working and transport position and which positively secures the unit to the tractor against accidental displacement by engagement with obstructions or the like.

A further object is to provide an improved means for supporting the harvesting unit for adjustment vertically between working and transport positions.

A still further object is to provide an improved mounting structure by which a husking or shelling unit may be supported entirely on the trailing hitch linkage of a tractor in position to function with picking units supported at opposite sides of the tractor.

Other objects and advantages of the invention will become apparent from the following detailed description of the preferred embodiment illustrated in the accompanying drawings in which FIGURE 1 is a top view of a two-row corn harvester with a husking or shelling unit mounted on a tractor by means of a hitch structure embodying the features of the invention, the tractor and harvester being shown in broken lines.

Figure 1:
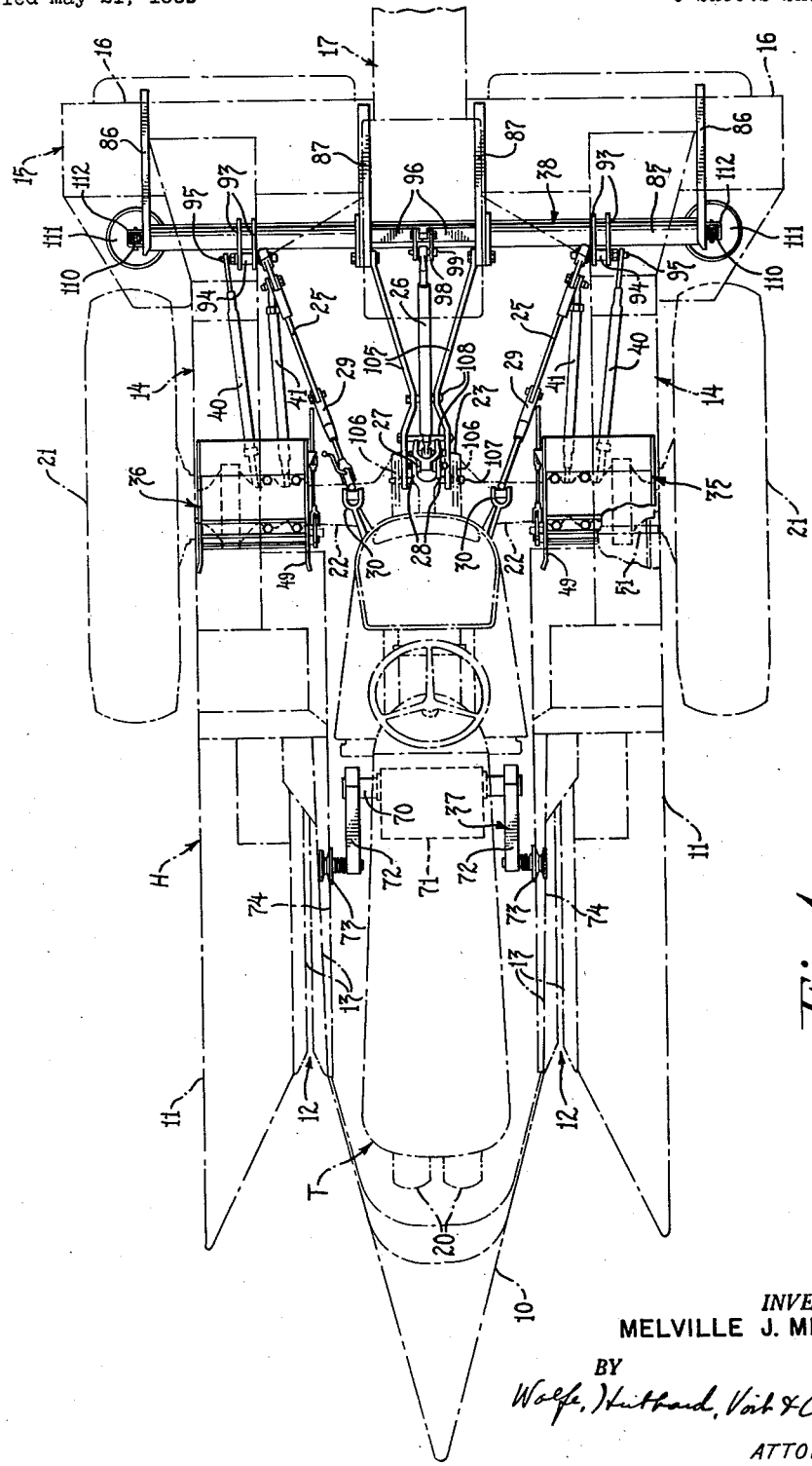

While a single preferred embodiment of the invention has been shown and will be described in detail herein, there is no intention to limit the invention to details of the illustrated embodiment. The intention is to cover all modifications and adaptations falling within the spirit and scope of the invention as more broadly or generally characterized in the appended claims.

For purposes of illustration, the invention has been shown in a form particularly suited for mounting a two-row corn harvester H on a tractor T equipped with a power elevatable trailing hitch linkage of the type supplied on the well-known "Ferguson" tractor. The harvester shown has a front section consisting of two picking or gathering units defined by a central divider 10 and a pair of gathering arms 11 respectively disposed at opposite sides of the tractor. The gathering arms extend alongside the tractor parallel to its longitudinal axis and are connected with the central divider by a suitable frame means. The divider and gathering arms cooperate to define a pair of stalkways 12. Conventional snap rolls 13 at the sides of each stalkway snap the ears from the stalks and carry them rearwardly to elevators 14 which transport the ears to the rear of the tractor and deliver them to a husking or shelling unit 15 supported at the rear of the tractor.

The unit 15, which comprises the rear section of the harvester, may be equipped with either husking or shelling mechanism. It includes a pair of hoppers 16 positioned below the discharge ends of the conveyors 14. The ears delivered to the hoppers are fed to the husking or shelling mechanisms which discharge the end product to a central elevator 17 for conveyance to a vehicle towed behind the tractor.

The tractor T shown is of the tricycle type having closely spaced dual front wheels 20 for steering and widely spaced rear drive wheels 21. The latter are supported on axle housings 22 which project at opposite sides of the tractor differential housing 23. The axle housings are conventionally formed with pads 24 (FIGS. 4 and 5) provided with flat mounting surfaces at the top and bottom of the housing for mounting accessory apparatus. The pads, in this instance, are utilized for mounting harvester supporting brackets, as will appear presently.

Figure 4:
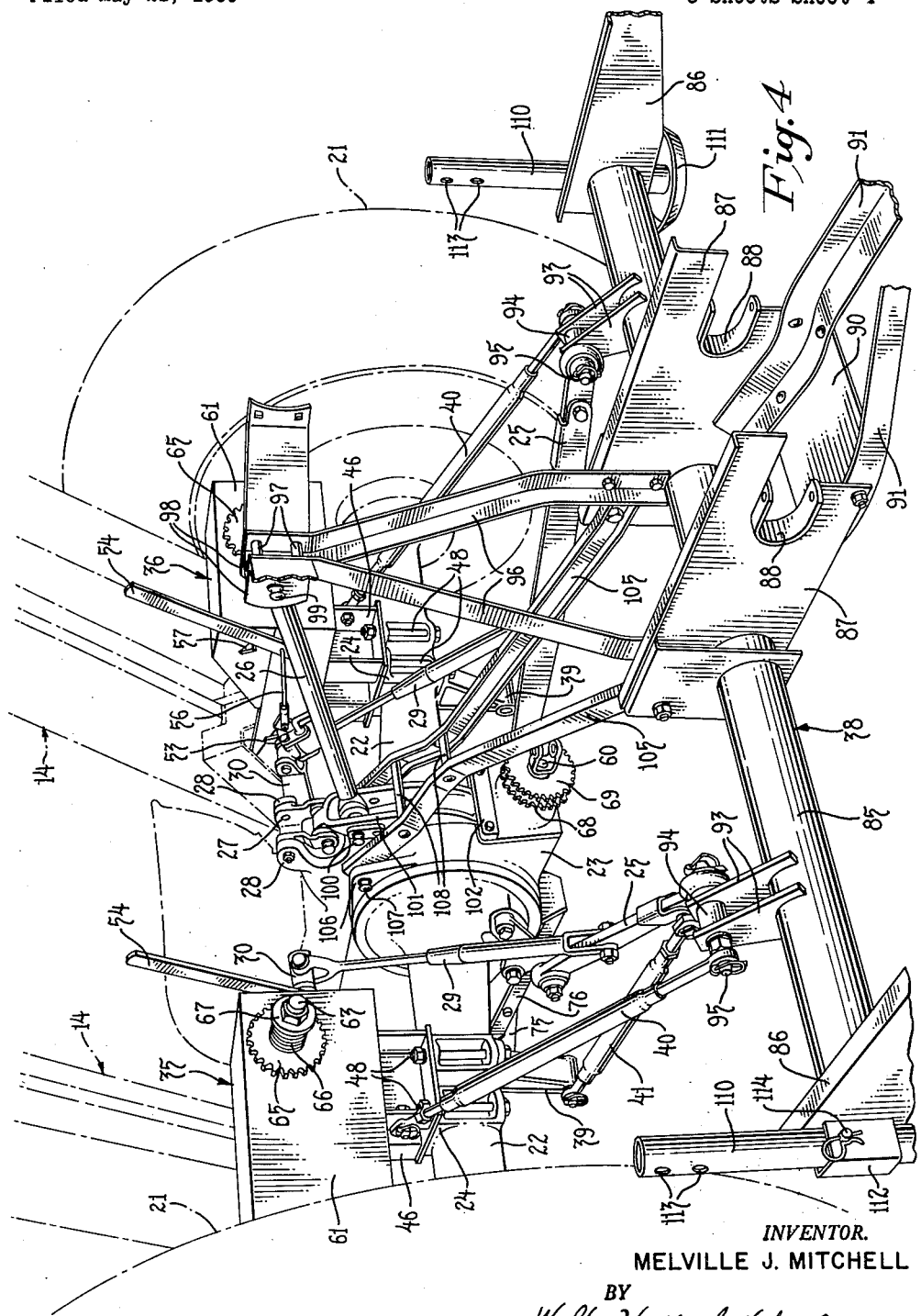
FIG. 4 is a perspective view of the rear of the tractor and the hitch structure including the framework for supporting a husking or shelling unit.

Referring more particularly to FIGS. 1 and 4, the exemplary tractor is equipped with a "Ferguson" hitch linkage of the conventional type. This includes a pair of lower or draft links 25 each pivotally secured at its forward end to the tractor body below and slightly forward of the axle housings to swing both vertically and horizontally. A top link 26 is normally connected at its forward end to a rocker element 27 pivoted between a pair of laterally spaced lugs 28 projecting from the tractor center housing. Drop links 29 connect the draft links 25 with lift arms 30 on the tractor which are adapted to be rocked upwardly by hydraulic lift mechanism provided in the tractor body to raise the links.

In accordance with the invention, the corn harvester H is mounted on the tractor by means of a novel hitch structure which makes the mounting and detachment of the harvester an easy, one-man job. The tractor is therefore readily available for any work for which it is needed during the corn harvesting season, as the harvester may be detached in a matter of moments when the tractor is required for conventional work and may be as quickly remounted when required for harvesting corn. In its preferred form, the hitch structure comprises a pair of brackets 35 and 36 and a lift device 37 which are permanently attached to the tractor and which cooperate with coupling elements provided on the front section of the harvester which includes the two picking units. The coupling elements provide pivotal support for the front section adjacent the rear portion of the tractor and vertically movable support for the front portion of the section by which it may be tilted between working and transport positions.

A frame 38 is provided for the rear harvester section which includes the husking or shelling mechanisms. It is equipped with coupling means for attachment to the tractor hitch linkage. The brackets 35 and 36, together with additional brackets 39 permanently mounted on the tractor, provide anchorages for stabilizing bars 40 and 41, which serve to hold the rear harvester section against lateral or vertical swinging.

Figure 2:
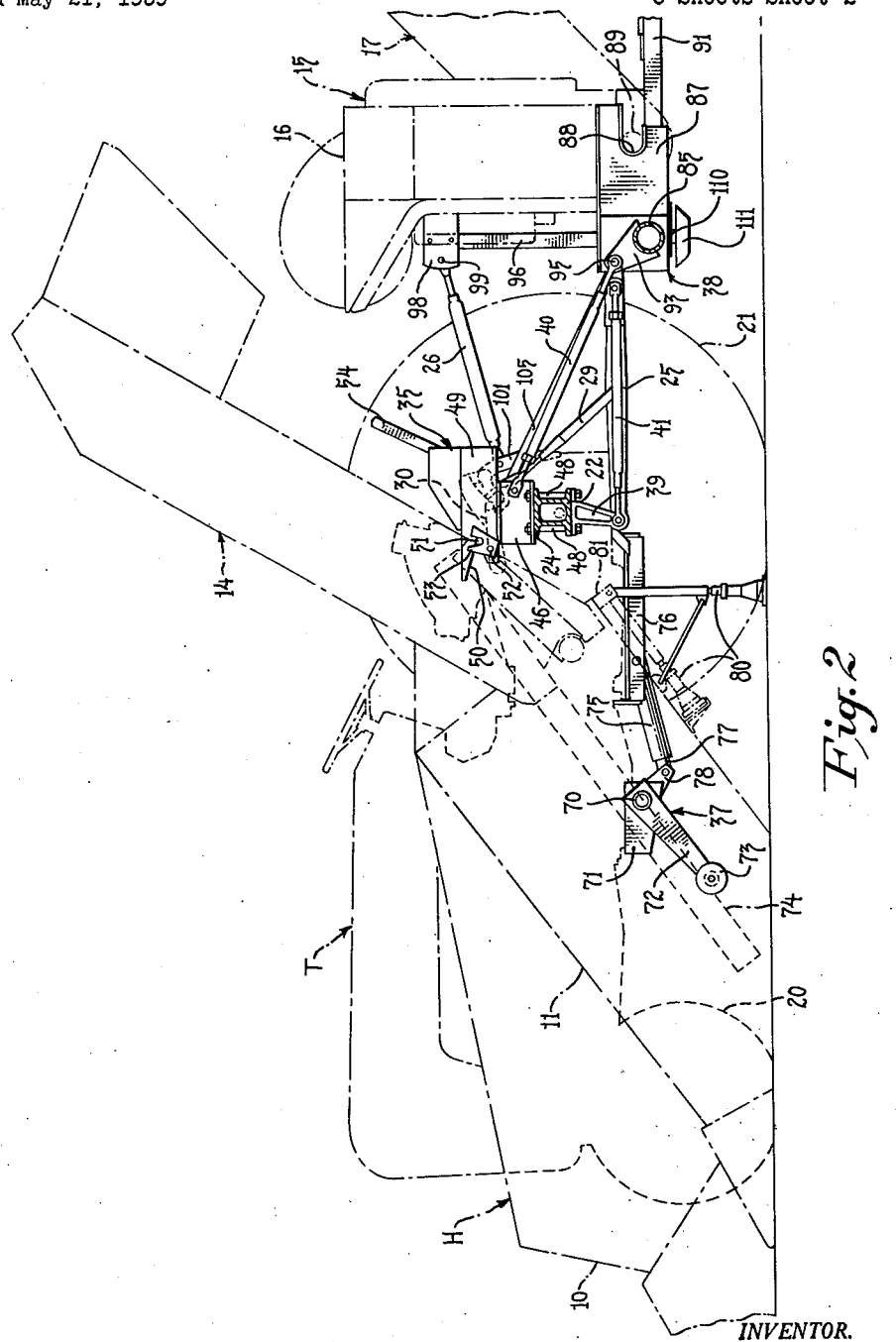
FIG. 2 is a side elevation view of a tractor-implement combination shown in FIG. 1 with the corn picking units shown in working position.
Figure 3:
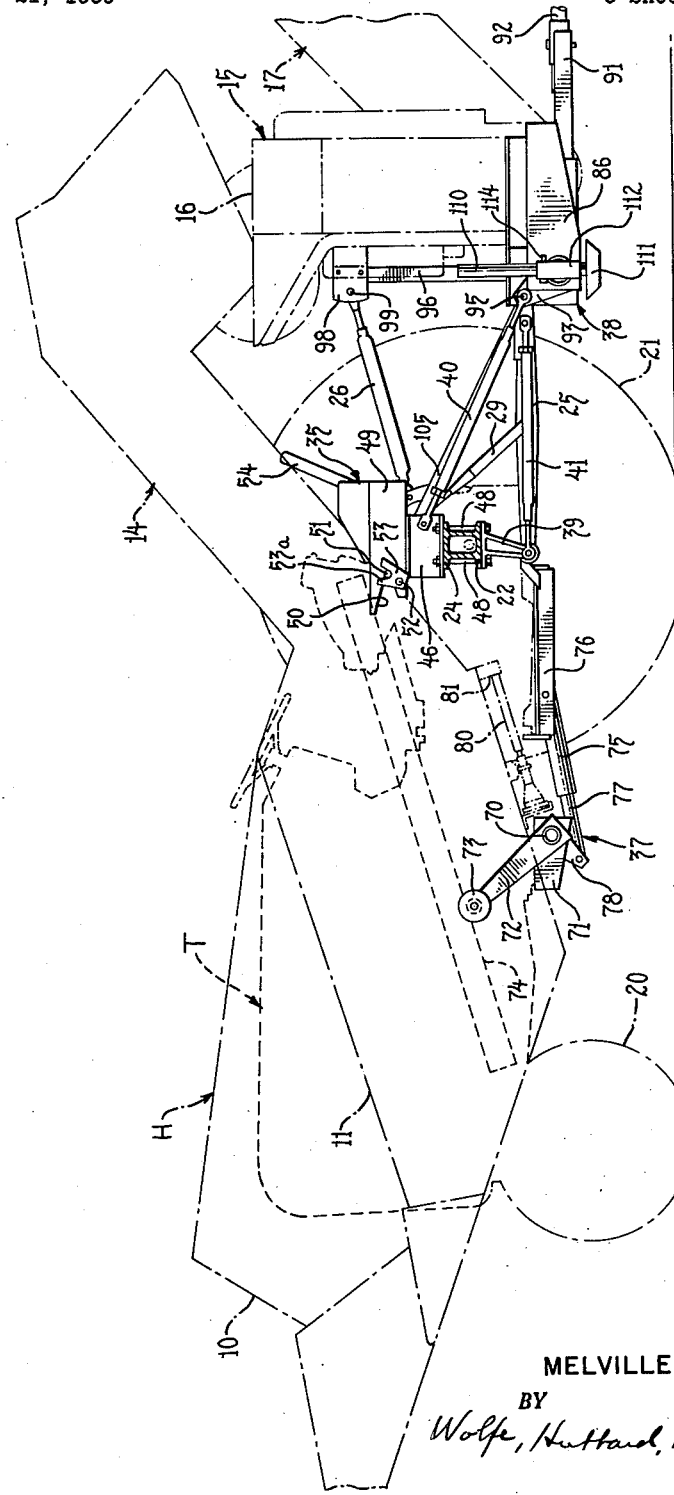
FIG. 3 is a side elevational view similar to FIG. 2 but showing the picking units raised to transport position.
Figure 6:
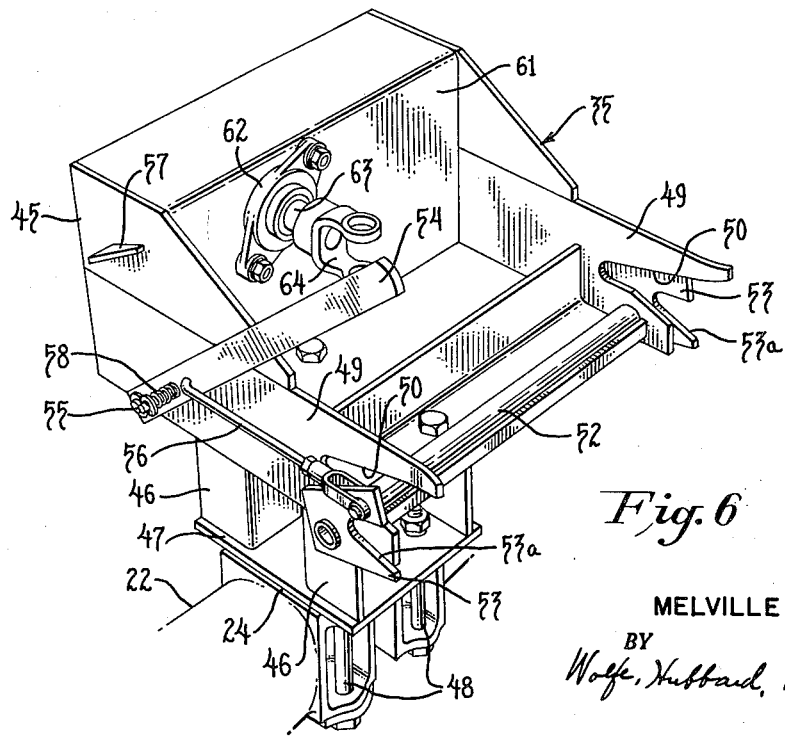
FIG. 6 is a perspective view of one of the brackets provided on the tractor for attachment of a corn harvester.

The brackets 35 and 36, which provide pivotal support for the front harvester section, are alike and a description of one will therefore suffice. As shown in FIGS. 2, 3 and 6, each bracket comprises a generally rectangular boxlike body 45 made up of steel plates or the like welded together to form a rigid structure. A pair of channel members 46 welded to the bottom wall of the body and depending therefrom in back-to-back relation terminate in a horizontal mounting plate 47 adapted to rest on one of the pads 24 provided on the rear of the tractor hitching. The mounting plate is suitably apertured for registration with holes provided in the pads 24 for the reception of bolts 48 by which the brackets are rigidly secured in place on the axle housings.

As shown in FIG. 6, each bracket has a pair of lower side plates 49 extending forward and formed with forwardly opening V-shaped notches 50 constituting sockets for transversely extending pivot shafts or pins 51 provided on the respective gathering arms 11 of the front harvester section. As will be seen by reference to FIGS. 2 and 3, the pivot pins 51 are located adjacent the upper ends of the gathering arms close to their junction with the elevators 14 and the latter extend rearwardly and upwardly over the brackets.

The sockets 50 are located so that the pivot pins 51 may be engaged therein by running the tractor forwardly relative to the harvester section while the latter is supported in the upright position shown in FIG. 2. Provision is made for positively locking the pivot pins in the sockets so that the front or gathering section cannot be accidentally tipped or displaced from its proper position in the event that one of the gathering arms meets an obstruction or the like. For this purpose, the side plates 49 are apertured to receive and rotatably support a rock shaft 52 and locate it below the lower edge of each of the sockets substantially midway of such edge. A latch plate 53 is rigidly fixed to each end of the rock shaft to lie closely along the outer side of the adjacent plate 49. Each latch is formed with a V-shaped notch 53a adapted to be positioned with its open end facing forwardly and substantially in alinement with the socket 50 when the shaft 52 is rocked to the open or released position shown in FIG. 1. Accordingly, as the tractor moves forwardly to engage the pivot pins 51 in the socket 50, the pins also engage in the notches 53 and, by reason of the offset relation of the pivotal axis of the latch plates to the sockets, the latch plates are rocked counterclockwise until the notches are disposed in crossed relation to the sockets.

Further rocking of the latch plates to positively lock the pins in the sockets 50 is effected by a hand lever 54 pivoted at its lower end on a pin 55 fixed to one of the side plates 49 of the bracket. A tension link 56 connects the lever with the latch plate at the adjacent end of the rock shaft. The latching mechanism is positively retained in place by engaging the hand lever behind a latch lug 57 welded to and projecting from the side of the bracket. To facilitate such latching, the lever is conveniently mounted on the pin 55 for limited movement axially thereof. A coiled compression spring 58 interposed between the head of the pin and the lever urges the latter against the side wall of the bracket and thus serves to releasably retain it in latched position.

The brackets 35 and 36 also carry means for effecting a drive connection between the gathering chains and snap rolls of the gathering arms and the tractor power take-off shaft 60 which conventionally projects at the rear of the tractor as shown at FIG. 4. Referring to FIG. 6, a transverse vertical wall 61 forming a part of each of the brackets 35, 36 is fitted with a bearing 62 which journals a short drive shaft 63. One element 64 of a universal coupler is splined or otherwise nonrotatably fixed to the forward end of the shaft for effecting a driving connection with the shaft of the gathering unit.

At its aft end, each shaft 63 is fitted with a sprocket wheel 65 (FIG. 4) which, for safety purposes, preferably has a friction driving connection with the shaft. This drive connection may be of any preferred construction and as shown includes a compression spring 66 interposed between the sprocket wheel and a stop washer 67 fixed to the end of the shaft. The spring urges the sprocket wheel into frictional engagement with a drive plate or other suitable device fixed to the shaft. The bracket walls 61 are located so as to position the respective sprocket wheel 65 in the same transverse vertical planes with sprocket wheels 68 and 69 nonrotatably mounted on the power take-off shaft 69 for the accommodation of roller chains or the like.

The supporting and lifting device 37 which provides vertically adjustable support for the front end of the gathering section of the harvester, comprises in this instance a rock shaft 70 (FIGS. 1, 2 and 3) extending transversely across the tractor and supported in spaced bearings carried by a depending bracket 71 permanently attached to the underside of the tractor body. The shaft extends below each of the gathering arms 11 and has at each end a rigid radially projecting arm 72. Rotatably supported adjacent the outer end of each arm 72 is a grooved roller 73 adapted to supportingly engage an elongated rail 74 extending along the underside of the adjacent gathering arm. When disengaged from the rails, the rollers are urged outwardly by springs so that their beveled inner sides are certain to engage the rails in case of some misalinement when the roller arms are raised.

Provision is made for rocking the shaft 70 to swing the gathering section of the harvester about the pivot pins 51 between the lower or working position in which it is shown in FIG. 2 and the raised or transport position shown in FIG. 3. This means in its preferred form comprises a one-way hydraulic ram including a cylinder 75 pivoted at its closed end between a pair of longitudinally extending mounting bars 76 attached to the underside of the tractor body. The cylinder is fitted with a plunger or ram 77 which projects forwardly from the cylinder and is pivotally connected with a crank arm 78 rigid with the shaft 70. The arrangement is such that the front section of the harvester is raised to transport position upon introduction of pressure fluid into the closed end of the cylinder to force the ram forwardly. When the fluid is permitted to exhaust from the cylinder the overhanging weight of the harvester section carries it downwardly and rocks the arms 72 and shaft 70 counterclockwise to force the plunger 77 back into its cylinder. Pressure fluid is conveniently supplied to the cylinder 75 from the hydraulic system of the tractor under control of auxiliary valving of any suitable type.

Provision is made for supporting the front harvester section in an upright position when it is detached from the tractor so that the section may be remounted by simply driving the tractor ahead to engage the pivot pins 51 in the sockets 50 in the tractor carried brackets. When the harvester section is to be mounted, the ram plunger 77 is preferably retracted so that the rollers 73 while engaging the rails 74 do not lift the front end of the section from the ground. In the upright position of the gathering section the forward ends of the gathering arms rest on the ground as shown in FIG. 2.

Ground support for the aft end of the front harvester section is provided by a pair of adjustable jacking members 80. These members may be of any preferred type as, for example, screw operated jacks. Each has an enlarged ground engaging foot at its lower end and is pivotally connected at its upper end to a bracket 81 projecting from one of the gathering arms, preferably adjacent the junction of the arm and its associated conveyor 14. The pivotal connections with the brackets 81 permit the jacks to be swung to and latched in retracted positions shown in broken lines in FIG. 3 when the harvester is in use or when it is being transported. When the harvester is disengaged from the tractor, the jacking members are released and swung down to the ground engaging position shown in FIG. 2. With the elevating support arms 72 in their down position, the gathering arms rest on the ground as shown in FIG. 2 and the jacking members are adjusted vertically to carry the weight of the rear portion of the section. The latches 53 may then be released and the tractor backed up to free the front harvested section. Remounting on the tractor may be effected by simply reversing the above series of steps.

The rear section 15 of the harvester preferably includes a frame comprising a transverse member 85 adapted to support the husking or shelling mechanisms and the conveyor 17. The frame constitutes a part of the improved hitch structure and, to this end, it is equipped with coupling means for attachment to the tractor hitch linkage and for the connection of the various stabilizer bars. To provide support for the husking or shelling mechanisms, and to properly aline their hoppers 16 with the conveyors 14, the member 85 carries two end brackets 86 and a pair of laterally spaced central brackets 87. The brackets, which may conveniently comprise sheet metal stampings, are welded or otherwise suitably secured to the cross member and extend rearwardly therefrom. Each of the brackets has its upper edges flanged over to provide horizontal stiffness for the brackets.

The brackets 87 are additionally formed to provide rearwardly opening sockets 88 for the accommodation of mounting pins 89 (FIG. 2) projecting at the lower end of the elevator 17 and by which the elevator is adjustably supported. The brackets 87 are connected at their lower edges by a cross member 90 which, together with the brackets, provide an anchorage for a pair of angle bars 91 which converge rearwardly for attachment of a tongue 92 (FIGS. 3 and 5) by which a vehicle is to be towed is coupled to the tractor-implement combination.

For coupling the frame to the tractor, pairs of forwardly projecting arms 93 are welded to the member 85 intermediate each pair of brackets 86—87. The arms are connected at their outer ends by a bushing 94 and apertured for the reception of a coupling pin 95 adapted to engage in the socketed ball conventionally provided by the trailing end of each of the tractor draft links 25. The pins also engage in an aperture in the end of the stabilizing bar 40 which, at its other end, is anchored to the channel member forming a part of the bracket 35, 36.

Upright struts 96 bolted, in this instance, to the brackets 87 provide for a connection with the upper link 26 of the hitch linkage. As shown in FIG. 4, the struts converge toward their upper ends which are bolted or otherwise rigidly connected together with suitable spacers 97 interposed between them. Rigid plates 98 projecting forwardly from the upper ends of the struts are thus spaced apart to receive the socketed trailing end of the top link 26 which is coupled to the plates by the usual coupling pin 99. In this case, the top link 26 instead of being pivoted to the rocker 27 on the tractor, is pivotally secured as by a pin 100 to a depending lever 101 which is connected at its upper end to the rocker and which has its lower end confined between the tractor housing and a cross bar 102 bolted thereto.

Also bolted or otherwise attached to the central brackets 87 are a pair of forwardly projecting diagonal bars 105 apertured adjacent their forward ends for connection with lugs 106 and a "long" pin 107 conventionally provided on the center housing of the "Ferguson" tractor. In the particular form illustrated, the diagonal bars are bent inwardly intermediate their ends and connected by suitable spacers and through-bolts 108 which hold the ends of the bars in position to fit between the lugs 106.

Provision is made for supporting the rear harvester section 15 when detached from the tractor so that it can be easily and quickly remounted without handling. The supporting means as herein required comprises a pair of laterally spaced, retractable hitching members mounted opposite ends of the cross member. These support members are alike, each comprising an upright tubular standard 110 with an enlarged or mushroom head 111 for engagement with the ground. The standards are slidable in vertically disposed socket elements 112 welded to the outer brackets 86 at the end of the cross member. Each standard has a series of apertures 113 for the reception of a pin 114 insertable through alined holes in the socket member by which the standard is locked in fixed relation to the frame. The apertures are spaced apart so that the support members may be locked in a ground engaging position as shown in FIG. 5 or may be retracted to and locked in a raised, out of the way position as shown in FIGS. 2–4 when the harvester is in operation.

A third point of support substantially centrally and to the rear of the front supports above described is provided by a jack 115. In its preferred form the jack has an upright standard 116 with an enlarged ground engaging foot 117 at its lower end. A head 118, which can be traversed up and down the standard in the usual way by means of a hand lever 119, carries a clevis 120 adapted to be coupled to the tongue 92 of the frame. An additional connection is provided between the upper end of the standard and the elevator 17 by a lever 121 having an enlarged end portion pivoted to the end of the standard and to a bracket 122 projecting from the underside of the elevator. The pivots are located so provide an over center coupling and thus prevent accidental release of the jack while supporting the frame and during the connection of the tractor to the frame.

Figure 5:
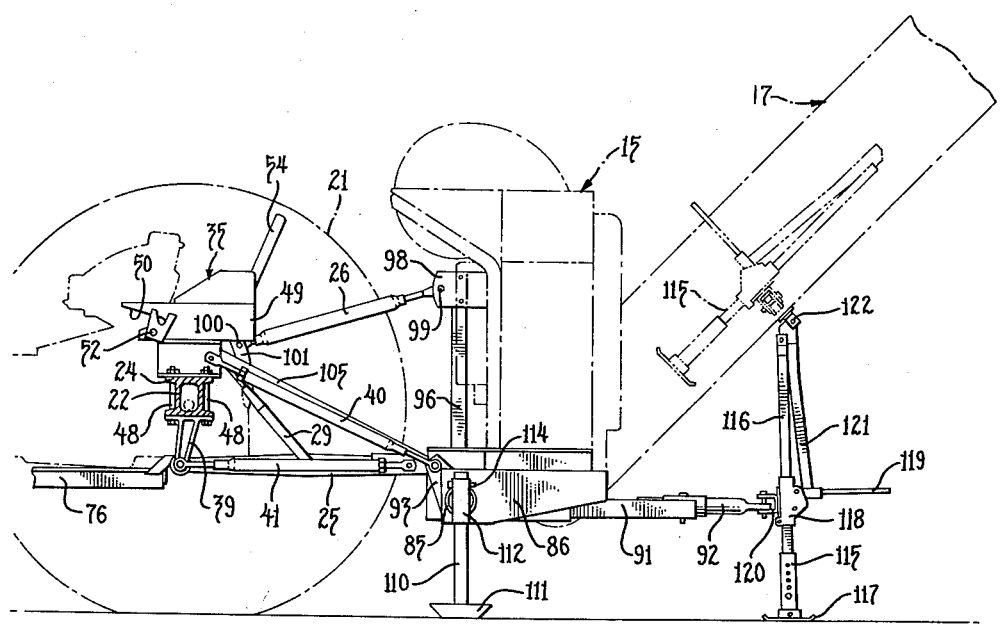
FIG. 5 is a side elevational view of the husking or shelling unit showing the manner in which it is supported for attachment to or detachment from the tractor.

With the rear section of the harvester supported in the manner above described and as shown in FIG. 5, the mounting on the tractor may be effected in a matter of moments. The tractor is simply backed up to the implement section and the lower links 25 are attached to the lift pins 95. The top link is then connected to the lever 101 by insertion of the pin 100, or to the plates 98 by means of the pin 99, depending on whether the link was originally attached to the harvester section or to the tractor. The positions of the coupling elements for attaching the top link are readily adjusted by raising or lowering the rear jack 115 to aline them for insertion of the pin 99 or pin 100. When this attachment is effected, the jack is released and transferred to the storage position. Using the tractor position control lever, the unit can now be raised for connection of the diagonal braces 105 to the tractor lugs 106 by means of the pin 107. The stabilizer bars 40 and 41 are finally attached between the tractor and the frame.

When the connection has been completed in the above manner, the entire support for the harvester is provided by the hitch linkage and associated stabilizer bars. Detachment of the frame is effected by reversing the steps above described.

It will be apparent from the foregoing that the invention provides a hitch structure of novel and advantageous construction which greatly facilitates the mounting of a corn harvester on and its detachment from a tractor. The front section of the harvester is quickly and easily mounted by simply driving the tractor forwardly into position to engage a pair of pivot pins in sockets provided on the tractor. When such engagement has been effected, the pivot pins are positively locked in place so that the harvester section cannot be tipped or displaced from its proper position in the event that it encounters an obstruction or the like. The support for the front end of the harvester section automatically engages upon completion of the pivot connection and provides a simple effective means by which the front end of the section may be raised and lowered between transport and working positions.

incorporation includes a to make the that section an easy one-man ... section of the harvester is supported ... the hitch linkage of the tractor thus ... need for the ground wheels ordinarily required ... such harvester components.

In general, the hitch structure is simple in construction. Its novel mode of operation makes the mounting and detachment of the corn harvester a one-man job and thus keeps the tractor available for its normal uses without reducing its availability for corn harvesting when required.

I claim as my invention:

1. A hitch structure for coupling a tractor and a two-row corn harvester having a pair of laterally spaced gathering arms adapted to extend longitudinally along opposite sides of the tractor, said structure comprising coupling elements adapted to be mounted on the tractor in laterally spaced relation for engagement by cooperating coupling elements on the harvester to form a pivotal connection between the harvester and the tractor, said cooperating coupling elements including one element which is longitudinally open with respect to the other element so as to be engageable upon generally horizontal movement to permit the tractor to be driven into the harvester to complete said pivoted connection, latch means on one coupling element of each pair operable to positively lock the elements in engaged relation, and vertically movable elements adapted to be mounted on the tractor for engagement with cooperating elements on the harvester located forwardly of said pivotal connection to provide adjustable support for the front portion of the harvester.

2. A hitch structure for coupling a tractor and a two-row corn harvester having a pair of laterally spaced gathering arms adapted to extend longitudinally along opposite sides of the tractor, said structure comprising coupling elements adapted to be mounted on the tractor in laterally spaced relation for engagement by cooperating coupling elements on the harvester to form a pivotal connection between the harvester and the tractor, said cooperating coupling elements including one element which is longitudinally open with respect to the other element so as to be engageable upon generally horizontal movement to permit the tractor to be driven into the harvester to complete said pivoted connection, latch means on one coupling element of each pair operable to positively lock the elements in engaged relation, vertically movable supporting elements adapted to be mounted on the tractor located forwardly of said pivot connection for engagement with cooperating elements on the harvester alined therewith upon establishment of said pivotal connection, and power operated means for shifting said movable elements upwardly to swing the harvester about its pivot on the tractor and raise the forward end of the harvester from the ground.

3. A hitch structure for coupling a tractor and a two-row corn harvester having a pair of laterally spaced gathering arms adapted to extend longitudinally along each side of the tractor, a pair of pivot pins mounted on said arms and extending transversely thereof, an elongated rail extending longitudinally of and depending from the underside of each arm, a pair of brackets respectively adapted to be mounted at opposite sides of the tractor, each of said brackets presenting a forwardly opening socket, a cross shaft adapted to be journaled on the tractor, crank arms fixed to said shaft, grooved rollers rotatably supported on said crank arms, said crank arms and said brackets being spaced apart so that said pivot pins enter said sockets and said rollers engage said rails as the tractor is driven forwardly relative to the stationary harvester, means for retaining said pivot pins in said sockets, and power operated means for actuating said cross shaft in a direction to rock the harvester about the pivot afforded by said pins to raise the gathering arms to transport position.

4. The combination of a tractor with a corn harvester, said harvester having a laterally extending coupling pin and a longitudinally extending rail, said tractor being provided with a power-actuated elevating means in engagement with said rail, an automatic coupling device comprising a bracket having a forwardly opening socket, and a coupling pin retaining means operatively associated with said bracket, whereby upon assembly of said tractor with said harvester said elevating means will coact with said rail and said coupling pin will be retained in said socket.

References Cited in the file of this patent

UNITED STATES PATENTS

| | | |
|---|---|---|
| 2,346,330 | Ratcliff | Apr. 11, 1944 |
| 2,763,976 | Kenjoski | Sept. 25, 1956 |
| 2,831,307 | Korsmo | Apr. 22, 1958 |
| 2,834,171 | Aber | May 13, 1958 |